US008274359B2

(12) United States Patent
Alicot et al.

(10) Patent No.: US 8,274,359 B2
(45) Date of Patent: Sep. 25, 2012

(54) WIRELESS CONNECTIVITY FOR SENSORS

(75) Inventors: Jorge F. Alicot, Davie, FL (US); Timothy J. Relihan, Lake Worth, FL (US)

(73) Assignee: Sensomatic Electronics, LLC, Boca Raton, FL (US)

( * ) Notice: Subject to any disclaimer, the term of this patent is extended or adjusted under 35 U.S.C. 154(b) by 572 days.

(21) Appl. No.: 12/477,480

(22) Filed: Jun. 3, 2009

(65) Prior Publication Data

US 2010/0308956 A1 Dec. 9, 2010

(51) Int. Cl.
*G05B 23/02* (2006.01)

(52) U.S. Cl. ......................... 340/3.1; 340/10.1; 370/412

(58) Field of Classification Search ................... 340/1.1, 340/10.1-10.6, 572.1-572.9, 3.1; 235/375-385; 370/412-416

See application file for complete search history.

(56) References Cited

U.S. PATENT DOCUMENTS 4,745,599 A * 5/1988 Raychaudhuri ............... 370/348
7,005,985 B1 * 2/2006 Steeves ...................... 340/572.1
2002/0158762 A1 10/2002 Nguyen et al.
2005/0270155 A1 12/2005 Sayegh
2006/0164213 A1 * 7/2006 Burghard et al. ............ 340/10.2
2006/0170550 A1 8/2006 Marsilio et al.

OTHER PUBLICATIONS

International Search Report and Written Opinion dated Oct. 14, 2010 for International Application No. PCT/US2010/001153, International Filing Date: Apr. 17, 2010 consisting of 14-pages.

* cited by examiner

*Primary Examiner* — Brian Zimmerman
*Assistant Examiner* — James Yang
(74) *Attorney, Agent, or Firm* — Alan M. Weisberg; Christopher & Weisberg, P.A.

(57) ABSTRACT

A wireless access point communicates messages in an electronic article surveillance (EAS) network. The EAS network includes at least one EAS sensor hard-wired to at least one wireless device node. The wireless access point includes a wired communication interface, a wireless communication interface and a controller. The controller is electrically coupled to the wired communication interface and to the wireless communication interface. The wired communication interface operates to receive a message. The message includes a sub-layer address corresponding to an EAS sensor. The wireless communication interface operates to broadcast the message and to receive an acknowledgement of the broadcast message. The acknowledgment originates from the EAS sensor corresponding to the sub-layer address. The controller operates to transfer the message between the wired communication interface and the wireless communication interface.

20 Claims, 7 Drawing Sheets

WIRELESS CONNECTIVITY FOR SENSORS

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to an electronic article surveillance ("EAS") and more specifically to a method and system for establishing wireless connectivity among EAS devices including EAS sensors.

BACKGROUND OF THE INVENTION

Sensors and other EAS equipment have an installation deployment cost associated with the installation of wires for the transfer of information. Wireless communication has been costly and the communication protocol stacks consume product memory. Additionally, a method for seamlessly connecting a wired network device to a wireless network has not been easily and cost effectively devised.

The use of wired connections for low cost sensors has been extensively used. However wired connections increase deployment burden. Higher cost wireless solutions implementing complex communication protocol stacks have been used in some deployments but are not effective in low cost sensors and deployments due to the expensive processing and memory costs associated with implementing complex communication protocol stacks. Some wireless solutions require configuration and setups that are time consuming and inflexible, increasing the deployment and maintenance cost.

Attempts to lower costs have been attempted with 2.45 GHz standards, such as those specified by Zigbee, a suite of high level communication protocols using small, low-power digital radios based on the Institute of Electrical and Electronics Engineers ("IEEE") standard 802.15.4 for wireless personal area networks ("WPANs"). However, the protocol stack as defined for Zigbee consumes a large amount of memory and requires a rather complex configuration. Other networks residing in the 2.45 GHz and higher frequency ranges occupy the same bandwidth space as customer solutions using IEEE 802.11, i.e., "Wi-Fi." These frequencies introduce challenges with Information Technology ("IT") wireless network interference and increase the maintenance burden on IT departments.

Therefore, what is needed is an inexpensive system and method for wirelessly interconnecting EAS devices and EAS sensors while minimizing interference with existing wireless systems.

SUMMARY OF THE INVENTION

The present invention advantageously provides a method and system for establishing wireless communication among EAS sensors and other EAS equipment. The present invention provides a layered addressing approach in facilitating connectivity of devices to the network which allows existing wired networks to seamlessly connect to a wireless node in the wireless network.

In accordance with one aspect of the present invention, a wireless access point communicates messages in an electronic article surveillance ("EAS") network. The EAS network includes at least one EAS sensor hard-wired to at least one wireless device node. The wireless access point includes a wired communication interface, a wireless communication interface and a controller. The controller is electrically coupled to the wired communication interface and to the wireless communication interface. The wired communication interface operates to receive a message. The message includes a sub-layer address corresponding to an EAS sensor. The wireless communication interface operates to broadcast the message and to receive an acknowledgement of the broadcast message. The acknowledgment originates from the EAS sensor corresponding to the sub-layer address. The controller operates to transfer the message between the wired communication interface and the wireless communication interface.

In accordance with another aspect of the present invention, an electronic article surveillance ("EAS") network includes an access point and at least one wireless device node having a wireless network layer address. The EAS network supports at least one EAS sensor having a sub-layer address. The at least one wireless device node is wirelessly coupled to the access point and hard-wired to the at least EAS sensor. The access point operates to receive a message through a first wired communication interface and broadcast the message through a first wireless communication interface. The message includes a sub-layer address corresponding to an EAS sensor. The access point further operates to receive an acknowledgement of the broadcast message through the first wireless communication interface. The at least one wireless device node operates to receive the broadcast message through a second wireless communication interface and forward the broadcast message through a second wired communication interface to the EAS sensor corresponding to the sub-layer address included in the received broadcast message. The at least one wireless device node further operates to receive an acknowledgement of the broadcast message through the second wired communication interface from the EAS sensor corresponding to a sub-layer address and forward the acknowledgement of the broadcast message through the second wireless communication interface.

In accordance with yet another aspect of the present invention, a method is provided for communicating messages in an EAS network. The EAS network includes at least one EAS sensor hard-wired to at least one wireless device node. A message is received through a wired communication interface. The message includes a sub-layer address corresponding to an EAS sensor. The message is broadcast through a wireless communication interface. An acknowledgement of the broadcast message is received through the wireless communication interface. The acknowledgment originates from the EAS sensor corresponding to the sub-layer address.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
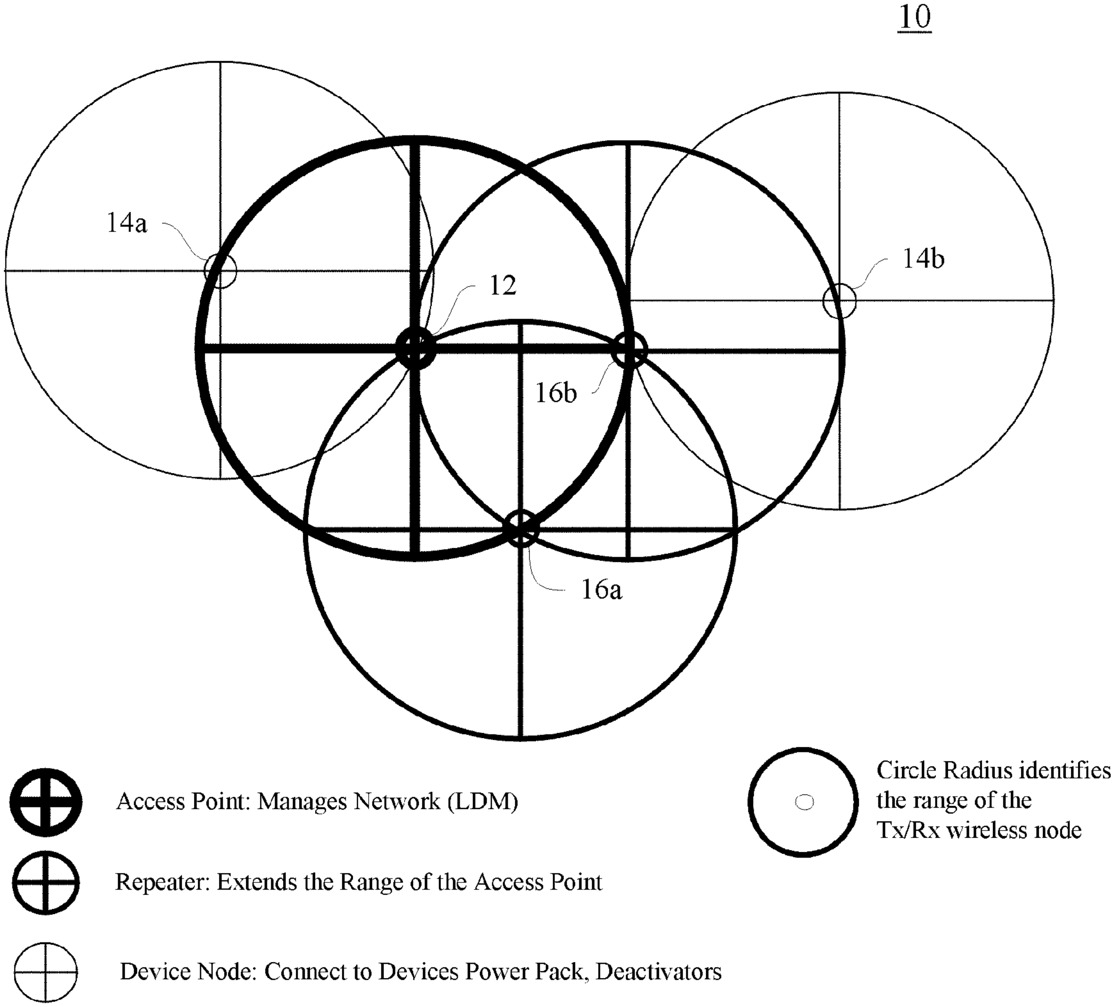
FIG. 1 is a block diagram of an exemplary EAS communication system arranged in a star configuration constructed in accordance with the principles of the present invention.

Before describing in detail exemplary embodiments that are in accordance with the present invention, it is noted that the embodiments reside primarily in combinations of apparatus components and processing steps related to implementing a system and method for wirelessly connecting electronic article surveillance ("EAS") equipment and EAS sensors. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for establishing wireless communication among EAS sensors and other EAS equipment. An embodiment of the present invention provides an architecture which expands upon a star topology by defining a method for layering repeaters on the star network and implementing a new communication scheme. The architecture provides a layered addressing approach in facilitating connectivity of devices to the network. This layered addressing approach allows existing wired networks to seamlessly connect to a wireless node in the wireless network.

An embodiment of the present invention advantageously provides an effective means to seamlessly interface devices which use a serial interface and are not specifically designed for wireless networks to a wireless network. Bandwidth efficiency is obtained by maximizing the amount of information that is transferred in a RF channel and by minimizing the probability of breaking up information into multiple smaller payload transmissions which introduce additional framing bytes of overhead. Although the embodiments described below identify the sensors as EAS sensors, the principles of the present invention may also be applied to other types of sensor devices, including but not limited to intrusion sensors, temperature sensors, humidity sensors, etc.

Referring now to the drawing figures in which like reference designators refer to like elements, there is shown in FIG. 1, an exemplary electronic article surveillance ("EAS") communication network 10 for wirelessly connecting EAS sensors and equipment. Network 10 may include a wireless access point ("AP") 12 which manages the network 10 and implements a poll-response protocol scheme to transfer information. Wireless device nodes 14*a*, 14*b* (two shown, referenced collectively as "wireless device node 14") join the network 10 after being authenticated according to a join token. The join token is a value shared by all devices that form part of a particular network. Multiple networks can co-exist by using different join tokens. Repeaters 16*a*, 16*b* (two shown, referenced collectively as "repeater 16") are used to extend the range of the access point 12. Operation of the repeater 16 is discussed in greater detail below. It should be noted that network 10 may include any number of access points 12, device nodes 14 and repeaters 16.

The exemplary network 10 illustrated in FIG. 1 includes two repeaters 16*a*, 16*b* deployed around an access point 12. Repeaters 16 join a network 10 and retransmit RF communication packets according to a decay value. Once a repeater 16 receives a transmission, the repeater 16 re-plays the transmission if the decay value is not zero and decrements the decay count. A repeater 16 seeing a retransmission from another repeater 16 also replays the transmission if the decay count is not zero. Since a message is re-played, the bandwidth used by a transmission doubles each time a repeater 16 re-transmits a message. There is also the possibility that a repeater 16 will retransmit the same message more than once if a different repeater 16 re-transmits the message. In one mode of operation, a repeater 16 only retransmits messages received from an access point 12 or wireless device node 14. This mode of operation avoids the repeated transmission of the same message by a repeater 16. Alternatively, the decay count can be set to 1 by the access point 12 or wireless device nodes 14. This method allows for the addition of multiple repeaters 16 around an access point 12 and expansion of the network range. The coverage provided by this approach is sufficient for the majority of applications.

Figure 2:
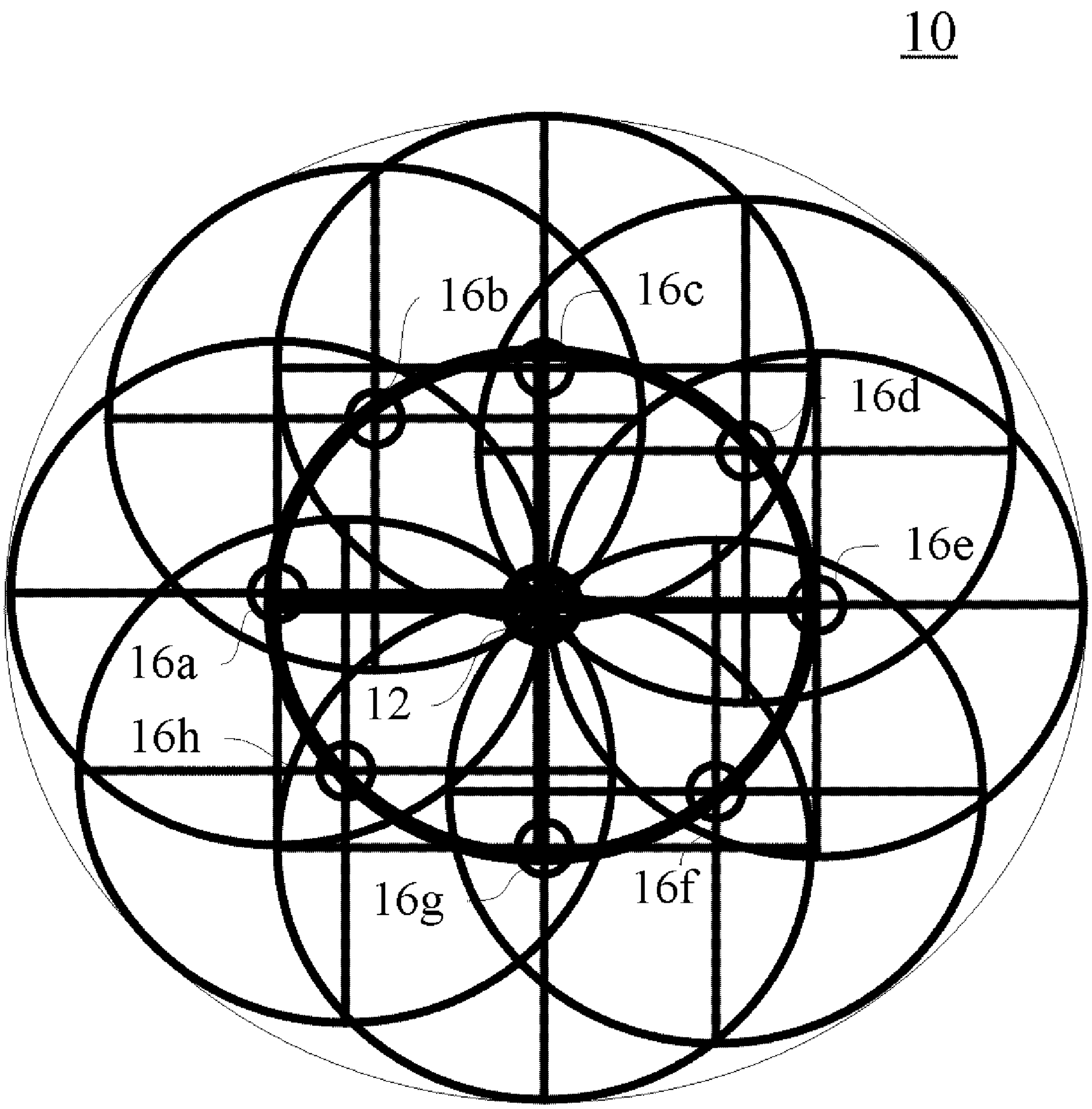
FIG. 2 is a block diagram illustrating increased range for a wireless access point through the use of repeaters constructed in accordance with the principles of the present invention.

An alternative embodiment illustrating how the range of the access point 12 may be increased by a layer of repeaters 16 is shown in FIG. 2. In order to deploy multiple repeaters and extend coverage, re-transmission control is introduced by tracking the address of the originating wireless node 14 and the message identification number used by the originating wireless node 14. This control qualifies a message before being re-transmitted by a repeater 16. Messages that are re-transmitted by a repeater 16 are stored in a tracking table. The tracking table is checked whenever a message is received from a repeater 16. Transmission frames include a transmitting device type which allows the receiving device to determine if the message is from a wireless node device 14, access point 12 or repeater 16. Another device identifier may be a wireless tag. Repeaters 16 always repeat messages from any wireless node device 14, with the exception that messages from repeater devices 16 are qualified against the tracking table before retransmission. When a new message ID is received from a device 46, the tracking table is updated.

Figure 3:
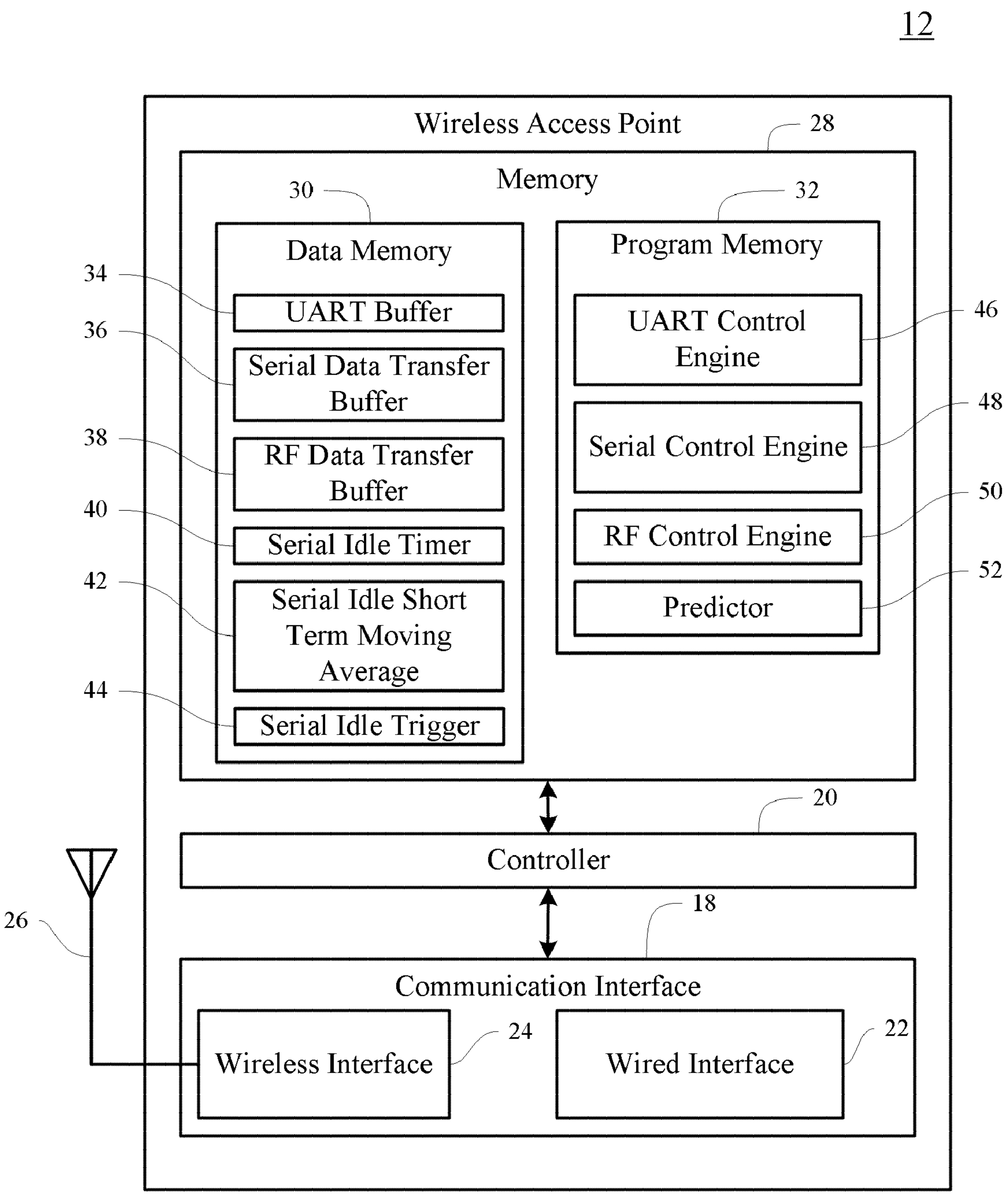
FIG. 3 is a block diagram of an exemplary wireless access point constructed in accordance with the principles of the present invention.

Referring now to FIG. 3, a wireless access point 12 includes a communication interface 18 communicatively coupled to a controller 20. The communication interface 18 includes at least one wired interface 22 and at least one wireless interface 24 coupled to an antenna 26. The communication interface 18 transfers data packets between the wireless access point 12, repeaters 16 and other devices within the communication network 10 using an exemplary radio frequency ("RF") protocol defined below. The communication interface 18 may include any number of communication ports.

The controller 20 controls the processing of information and the operation of the wireless access point 12 to perform the functions described herein. The controller 20 is also coupled to a memory 28. The memory 28 includes a data memory 30 and a program memory 32.

The data memory 30 includes three buffers associated with transferring data the network 10 and various other user data files (not shown). The buffers include a universal asynchronous receiver/transmitter ("UART") buffer 34, a serial data transfer buffer 36 and an RF data transfer buffer 38. The UART buffer 34 contains a single byte of data to be transmitted to or received through the wired interface 22. A UART data structure is discussed below.

The data memory 30 also includes a serial idle timer 40, a serial idle short term moving average 42 and a serial idle trigger 44. The serial idle timer 40 is a free-running counter which tracks the time elapsed between UART packet transmissions. The serial idle trigger 44 is a maximum idle value allowed before triggering an RF packet transmission. The serial idle short term moving average 42 is a series of samples of the actual serial idle time between UART packet transmissions and is used to adjust the serial idle trigger 44 as needed.

The program memory 32 contains a UART control engine 46, a serial control engine 48, an RF control engine 50 and a predictor 52. The UART control engine 46 directs the transfer of data to and from the UART buffer 34. Similarly, the serial control engine 48 directs the transfer of data to and from the serial data transfer buffer 36 and the RF control engine 50 directs the transfer of data to and from the RF data transfer buffer 38.

The predictor 52 determines when to transfer data and adaptively adjusts the serial idle trigger 44 appropriately. The predictor 52 determines when the idle time on the serial bus indicates that a sensor transmission has completed. By predicting the end of a transmission, the opportunity to gather the maximum number of bytes for a single RF transmission is increased. This approach maximizes the ratio of information data bytes to the framing and networking management bytes. Operation of the predictor 52 is discussed in greater detail below.

In addition to the above noted structures, each wireless access point 12 may include additional, optional structures (not shown) which may be needed to conduct other functions of the wireless access point 12.

Figure 4:
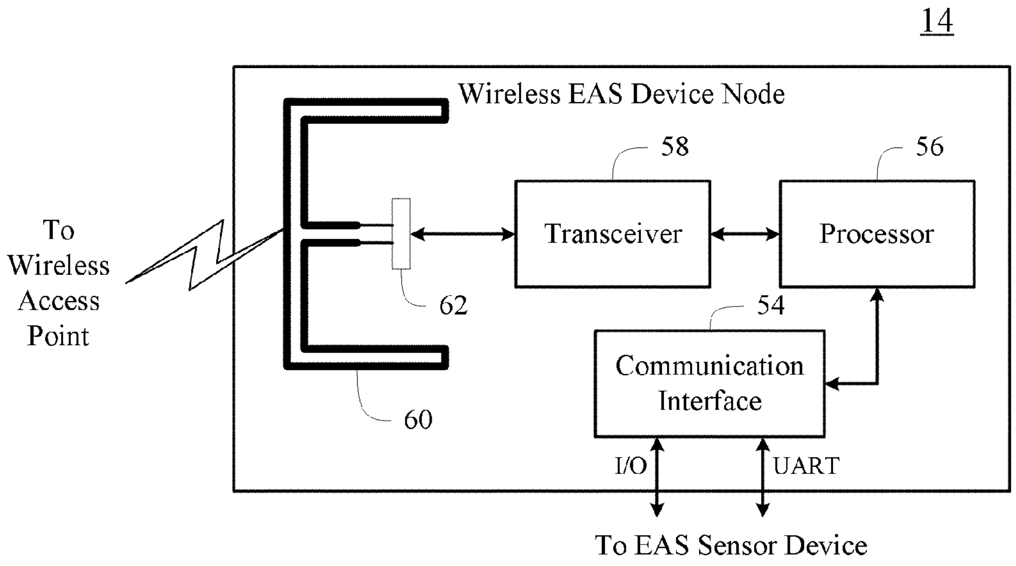
FIG. 4 is a block diagram of an exemplary EAS device node constructed in accordance with the principles of the present invention.

Referring now to FIG. 4, a wireless device node 14 includes a communication interface 54 electrically coupled to a controller 56. The communication interface 54 includes at least one wired interface, such as a UART or serial input/output ("I/O") interface. The communication interface 54 transfers information between the device node 14 and at least one EAS sensor (not shown).

The controller 56 controls the processing of information and the operation of the device node 14 to perform the functions described herein. The controller 56 is also electrically coupled to a transceiver 58. The transceiver 60 transmits and receives data packets from the wireless access point 12 through at least one antenna 60, in a manner known in the art. The antenna 60 may be, for example, a microstrip antenna coupled to the transceiver 60 using a balun 62.

Figure 5:
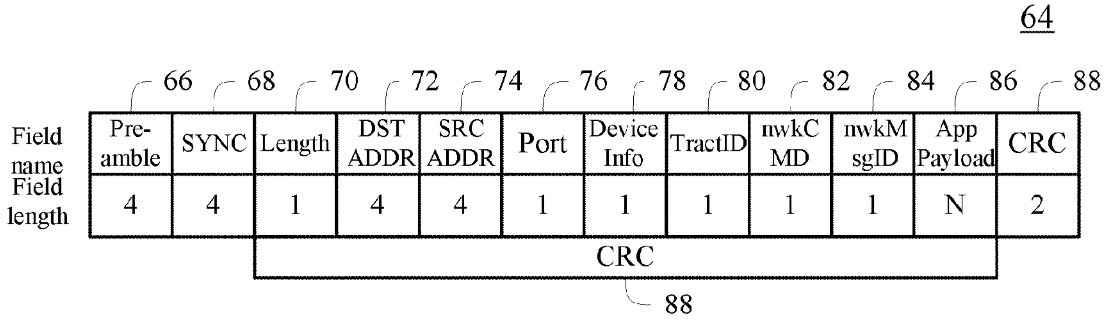
FIG. 5 is an exemplary RF packet frame structure constructed in accordance with the principles of the present invention.

Referring now to FIG. 5, the EAS communication network 10 implements a broadcast and a point-to-point messaging scheme between the access points 12 and the wireless device nodes 14. The network 10 may use the exemplary RF framing structure 64, i.e., a packet, shown in FIG. 5. The RF packet fields include Preamble 66, SYNC 68, Length 70, Destination Address ("DSTADDR") 72, Source Address ("SRCADDR") 74, Port 76, Device Info 78, Transaction ID ("TractID") 80, Network message command type ("nwkCMD") 82, Network message Identification ("nwkMsgID") 84, Application data ("App Payload") 86 and Cyclic redundancy check ("CRC") 88 fields. The preamble 66 and SYNC 68 fields are used for radio synchronization. The length field 70 contains the number of total bytes in the packet 64. The Destination Address 72 and Source Address 74 fields may be 4-byte fields which contain the address of the destination device and the source device, respectively; however, the length of the field may vary. The Port field 76 is a 1-byte field containing encryption context in the highest two bits and the Application port number in the remaining six bits. The Device Info field 78 contains sender/receiver and platform capabilities and is discussed in greater detail below. The Transaction ID field 80 includes an identifier for the present message. The Network message command type 82 and Network message Identification 84 fields are used for upper network layer messaging and identification for transmission management. The nwkCMD 82 identifies the type of message being transmitted. For example, when a packet is received by an access point 12 it is considered a point-to-point transmission and acknowledged by the access point 12 to the wireless device node 14. The nwkCMD field 82 value indicates to the device node 14 that this is an acknowledge transmission of an earlier package. The nwkMsgID 84 indicates which message is being acknowledged by the receiving node. At this point, the transmitting device node stops attempting to transmit the packet (after time out periods) because the packet has been received. A broadcast command has its own nwkCMD 82, in this case the device node 12 may not acknowledge the transmission if the implementation is for the wired sensor device to initiate the return acknowledge action. Similarly, download of firmware can have its own nwkCMD 82.

The remaining fields include the actual transmitted data, i.e., Application data 86 and a CRC 88 calculated based on all of the fields of the packet 64 except for the Preamble 66 and SYNC 68 fields.

Figure 6:
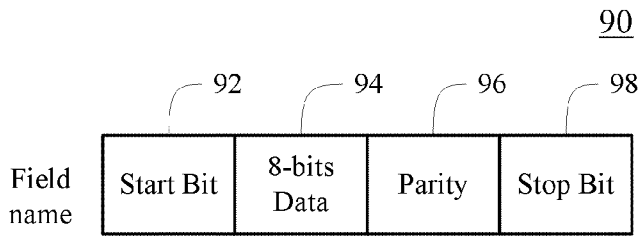
FIG. 6 is an exemplary UART packet frame structure constructed in accordance with the principles of the present invention

An exemplary UART packet structure 90 is shown in FIG. 6. The UART packet 90 is used in transmitting data between the wireless access point 12 and other devices using the wired interface 22. The UART packet 90 includes a start bit 92, an 8-bit data payload 94, a parity bit 96 and a stop bit 98.

Figure 7:
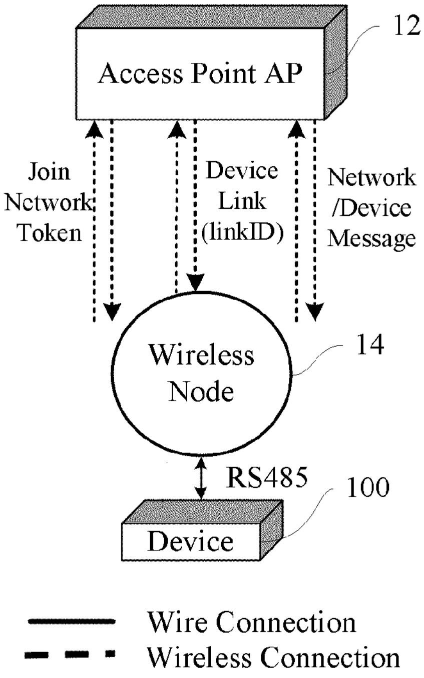
FIG. 7 is a control diagram illustrating an authentication process according to the principles of the present invention.

Referring now to FIG. 7, an exemplary network authentication process is shown. Before an end device 100, such as an EAS sensor, can participate in the wireless network 10, the end device 100 must be authenticated. The end device 100 is generally hard-wired to a wireless device node 14. The end device 100 connects to the network 10 after authentication. The authentication process begins when a device 100 wishing to join the network 10 issues a join message. The access point 12 responds to the join message to authenticate the device 100 to the network 10. A link message is exchanged between the access point 12 and each wireless node device 14 in the network. Links occur in pairs and establish a point to point connection. The access point 12 has a link ID for each connection. This link ID is used as a handle by higher level software operations to communicate point-to-point between wireless nodes, e.g., between the access point 12 and wireless device nodes 14.

The device address can be configured on the device 100 or a random addressing scheme may be implemented to reduce the configuration burden. In one embodiment of the present invention, the wireless node 14 selects a random address for operating on the network. The random address can be selected in multiple ways. One method is the use of a loose tolerance R-C network. The R-C network is tied to an input comparator pin of the processor. The RC time constant is chosen to allow the processor time to power up and start a counter. The processor starts a counter at power up, which in itself is random, and the counter counts until the comparator input pin is triggered by the RC time constant. The value in the register is used as the wireless node address or is used to generate the address according to some formula.

The random address selected by the device 100 is validated by the access point 12 at the time the wireless node 14 joins the network. If another wireless node 14 with the same address has already joined the network 10, the access point 12 issues an address verification message to determine if that old device is still on the network 10. The new device 100 trying to join does not respond to this address verification message. If the old device responds to the address verification, then access to the network 10 to the new device is denied and a duplicate address status returned. The new device 100 can be reset to produce a new random address to join the network 10 and the sequence repeats until the new device has a unique address. Alternatively, a software random number generator may be used to generate the initial address. It is also acceptable to have an incrementing counter and the counter value used to create the address. The count increments if the access point 12 does not accept the address.

Figure 8:
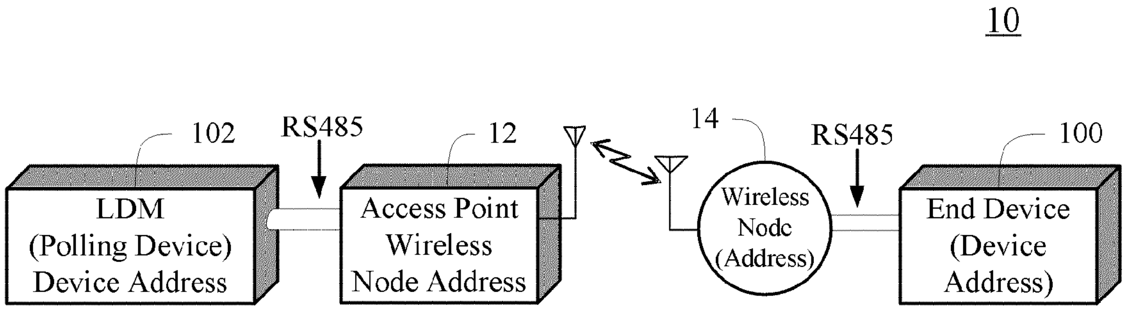
FIG. 8 is a block diagram illustrating layered addressing in accordance with the principles of the present invention.
Figure 9:
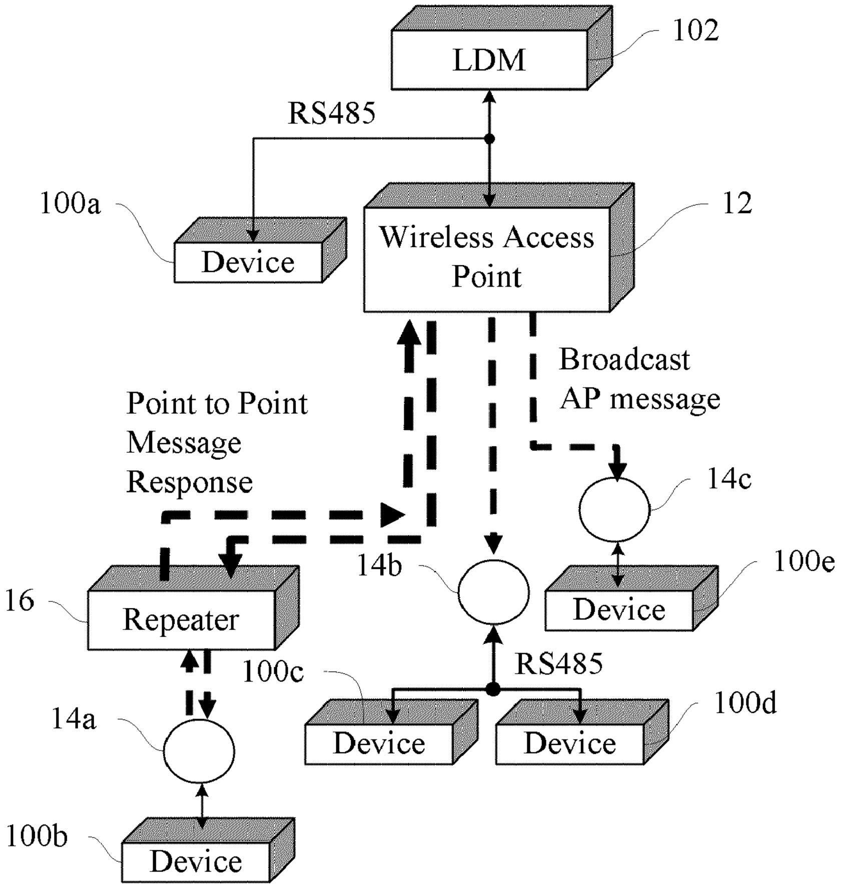
FIG. 9 is more detailed block diagram of the exemplary EAS communication system of FIG. 1 constructed in accordance with the principles of the present invention.

Referring now to FIGS. 8 and 9, one embodiment of the present invention provides a method of broadcast and response that relies on the sub-layer (address) device to complete the message acknowledgment for broadcast messages while device responses to a broadcast message are acknowledged at the wireless network layer. Point-to-point messages between a wireless node 14 and the access point 12 are acknowledged at the wireless network layer. The sub-layer manages message time outs and the rebroadcast of unacknowledged broadcast messages. An access point 12 broadcasts messages (payloads) received from a wired connection. The access point 12 may also forward a message received from a wireless node 14 as a broadcast message, or the access point 12 may forward the message to a specific wireless network node 14 depending on the received message information. When an access point 12 forwards a received wireless node message as a broadcast message, the access point 12 returns the information received from a device responding to the broadcast message back to the wireless node device 14 that requested the broadcast.

A local device manager ("LDM") 102 is wired to an access point 12. The wireless nodes 14 are connected to general EAS devices 100 (one shown). This layered addressing approach assigns an address to the wireless node device 14 which is used when communicating on the wireless network 10. Devices 100 that connect, through a wired serial interface (or serial/parallel PCB layout), to the wireless device node 14, implement a sub-layer addressing scheme. This sub-layer can work as its own independent communication network.

Messages received by the wireless access point 12 from an LDM device 102 are transmitted by the access point 12 as wireless broadcast messages. Broadcast messages are received by a wireless device nodes 14 and the frame payload, which is discussed in further detail below, is sent to the device 100 via a wired connection, such as but not limited to, a connection defined according to the RS485 specification. There is no acknowledgement back to the access point 12 that the wireless node 14 successfully received the broadcast message. Instead, devices 100 which have a matching address at the sub-address level will respond to the messages from the LDM 102. Thus, if a failure occurred, the sub-layer device 100 will not acknowledge the broadcast message. If the wired LDM 102 has not received an acknowledgement of the broadcast message within a predetermined length of time, the LDM 102 will resend the message to the access point 12. Therefore, the responsibility of guaranteed delivery rests with the LDM 102, not the wireless device nodes 12 and 14, allowing the wireless device node 14 to be relatively simple and inexpensive, e.g., a wired-to-wireless adapter.

A device 100 responding to an LDM broadcast, for example a poll command, sends its message to the wireless node 14 through the wired connection. The wireless node 14 uses a point-to-point transmission where the source and destination addresses of the wireless packet identify the source wireless device 12 and the destination access point 12 address. The payload of the wireless packet identifies the acknowledging source device 100 and destination wired device 102. Receptions of point-to-point messages are acknowledged at the wireless network layer. Retries, time outs and message IDs are used in strengthening wireless network transmission robustness.

In the case of frequency migration, the access point 12 transmits a frequency migration command that includes the new frequency indicator. After the command is issued, the access point 12 has the option of issuing a device node migration check command. After allowing time for migration, the access point 12 receives a confirmation from each device 100. If a device 100 does not migrate, the access point 12 can return to the prior frequency and re-issues the command and/or requests status from the lagging device 100. The access point 12 may return to the prior frequency periodically until all devices 100 have migrated. Exceptions are noted and included in the status of the access point 12 status.

Alternatively, a ping (periodic access point present signal) may be sent by the access point 12. For example, a ping is defined as the frequency migration command, or an access point present signal (which can be transmitted periodically by the access point) or other signal indicating the presence of the access point. Wireless devices 14 not receiving a ping at the expected time automatically move to the next frequency and listen for a ping from the access point 12. If a ping is not found the wireless device 14 will move to the next frequency and check for the ping command.

Figure 10:
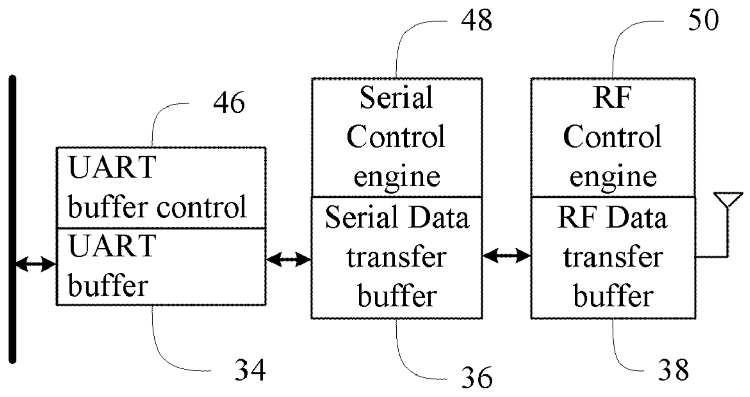
FIG. 10 is a block diagram of a parallel architecture design to simultaneously transfer RF channel data while receiving wired serial data in accordance with the principles of the present invention.

An exemplary parallel architecture design, as shown in FIG. 10, is used to simultaneously transfer RF channel data while receiving wired serial data and vice versa. In the outgoing (transmit) direction, a trigger determines when data in a serial data buffer 36 is transferred to an RF data transfer buffer 38. While the transfer is occurring between the serial control engine 48 and the RF control engine 50, the UART buffer control 46, in parallel, accepts incoming serial data packets into the UART buffer 34. In other words, data buffers between the serial control engine 48 and the RF control engine 50 may be transferred while UART buffer 34 is accepting new data. After the serial data buffer 36 transfers its data to the RF data transfer buffer 38, both the serial control engine 48 and the RF control engine 50 continue to work in parallel. The RF control engine 50 packetizes and manages the RF transmission, while the serial control engine 48 accepts new serial data.

In the incoming (receive) direction, recovered RF data is sent immediately to the serial interface after receiving a packet. After completing data collection, information in the serial data buffer 36 is processed without decoding incoming bytes received in the packet payload to gain knowledge of transfer count or signaling information, such as Start/Stop indicators. The RF network 10 can indicate that a packet is a partial packet based on receiving the maximum number of bytes in the RF buffer 38 and serial idle not occurring at the transmitting device. In which case, the recovered RF data is held in the serial data transfer buffers 36 until the rest of the packet is received. For example a receive buffer capable of holding 256 bytes, received from a transmitting node, may be used. The transfer should occur quicker than a UART buffer packet time.

Packets are received and processed from the serial bus as follows. A trigger is defined by the serial idle trigger 44 and is associated with the time that it takes to transmit a serial bus packet. Sensor applications often transmit information in bursts. These bursts may contain delays in between packet bytes or may be tightly coupled in time. An embodiment of the present invention learns the idle time between byte transmissions for a serial application (device) in order to more efficiently manage the bandwidth of the RF channels.

In defining a data transfer process, the following factors may be considered: RF transmission rate, RF radio chip first-in-first-out ("FIFO") size, serial transmission rate and idle time of the serial interface. RF radio chips can have predefined FIFO buffer sizes. FIFO usage is determined by application and data management algorithms.

The RF channel transfer rate should be higher than the serial interface transfer rate to decrease the amount of memory storage for serial data received and to provide buffer overflow robustness. This consideration is used to provide a seamless wireless connectivity to EAS devices.

Figure 11:
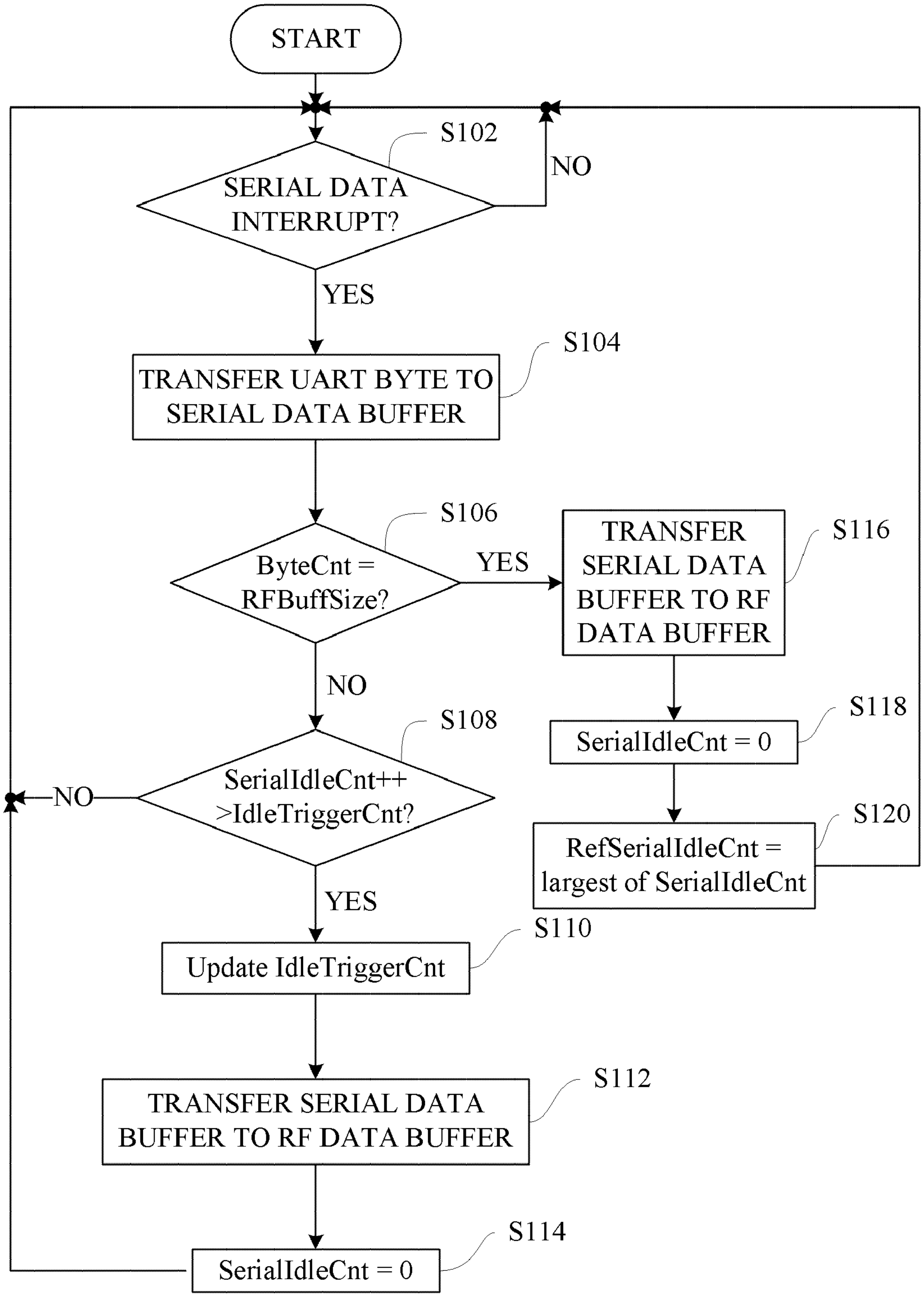
FIG. 11 is a flow chart of an exemplary EAS sensor transmission completion predictor process according to the principles of the present invention.

Referring now to FIG. 11, an exemplary operational flowchart is provided that describes steps performed by the predictor 52 for deciding when to end collecting data from a serial connection and begin an RF transmission, in accordance with the principles of the present invention. As the RF channel baud rate should be higher than the serial baud rate, allowing for robustness in providing a seamless connectivity to devices on the serial bus, for illustrative purposes only, an exemplary transfer rate of 250 Kbaud is used on the RF channel and 38.4K on the serial interface.

Sensors in EAS systems typically transmit data in bursts, thus the probability of a new packet associated with the present message being received decreases as the serial bus idle time increases. The predictor 52 tracks the time elapsed between serial byte packets using a free-running serial idle timer 40, which may be implemented as a counter, to adjust the serial idle trigger value 44 that triggers an RF transmission. The maximum serial idle time for a trigger may be defined as an application parameter. The initial setting is associated with the RF buffer transmission time and may be a product of some factor, for example, to 0.5, 1, or some increment (e.g., 2, 2.5, etc.) times the time used to transmit the RF buffer. Initially, the serial idle trigger 44 is set to a time equivalent to one RF transmission; however, as the serial idle time trigger 44 of the predictor 52 is an adaptive parameter, the serial idle time trigger 44 is adjusted to optimize the performance of the network 10. For example, the serial idle time trigger 44 of the predictor 52 is increased if the time lapse between bytes increases. The serial idle trigger 44 may be bounded by a maximum value of, for example, twice the RF transmission time. Larger maximum values may be implemented, if necessary, as required by the network design; however, the maximum trigger value should be set in reference to some known parameter, such as the RF transmission time. Generally, lapses between UART packets occurring greater than 2 milliseconds allow an RF transmission to take place seamlessly and create buffer space in the device.

The predictor 52 determines when to initiate a buffer transfer from the serial data transfer buffer 36 to the RF data transfer buffer 38 and vice versa. The predictor 52 is generally in an idle state until it detects an interrupt trigger, which may be presented in the form of a serial data interrupt (step S102). Triggers may include, for example, the serial transfer buffer 50 receiving the maximum number of bytes accepted by the RF buffer 52 or the time between serial bytes received exceeding the serial idle time trigger 44.

When the predictor detects an interrupt trigger (step S102), data in the UART buffer 34 is transferred to the serial data buffer 36 (step S104). If the amount of data in the serial data buffer 36, e.g., ByteCnt, has not reached the predetermined RF data buffer 38 size, e.g., RFBuffSize (step S106), then the trigger is most likely caused as a result of the free-running serial idle timer 40, e.g., SerialIdleCnt, reaching the serial idle trigger 44 limit, e.g., IdleTriggerCnt. If the free-running serial idle timer 40 has reached the serial idle trigger 44 limit (step S108), then the serial idle trigger 44 is updated (step S110) in the following manner.

In one embodiment, the serial idle time trigger 44 is constructed from a serial idle short term moving average ("MA") 42 and a long term predictor. The serial idle short term moving average 42 is of the form:

$$MA=(X_1+X_2+X_3+\dots+X_N)/N, \tag{1}$$

where $X_1 \dots X_N$ are measured samples of the actual serial idle time. A long term predictor ("LTP") is weighted along with the MA in formulating the serial idle trigger 44 value. An initial LTP value may be based on a settable initial value. This value can be correlated to the time needed to transmit a RF buffer or the time needed to receive a given number of UART bytes, e.g., two. Equation 2 defines the filter operation in determining the long term predictor value.

$$\text{LTP}=\text{LTP}*lpt\text{ Coeff}+MA*ma\text{ coeff}, \tag{2}$$

where $$lpt\text{ Coeff}+ma\text{ Coeff}=1. \tag{3}$$

The LTP is used as input to the serial interface idle time trigger. The lpt Coeff and ma Coeff determine the weighting given to LTP and MA.

A minimum idle constant, K, is added to the LPT in obtaining the serial idle time trigger 44. K accounts for the time in one serial packet transmission and provides a tolerance allow for minimal gaps in serial packet transmission. K is set to one or more serial packet times. Thus, the idle serial time trigger, $T_{IS}$, is given by Equation 4:

$$T_{IS}=K+\text{LTP}. \tag{4}$$

As reference, an RF transmission time of 2.3 mS (50 byte buffer+framing bits) corresponds to approximately 11 bytes transmitted on the serial interface. An embodiment of the MA 42 uses a value of one for N. However, the sample $X_N$ is taken as the largest time between serial byte packets in a given transmission. In this approach, the largest idle time between serial byte packets in a transmission is used to adapt the predictor 52. The single input is selected as the largest gap between transmission before the serial trigger occurred or the RF buffer byte count was reached. This approach allows for a low computational algorithm and favors the larger gap value in serial packet transmission. The weighting of LTP and MA determines the rate of change in serial idle time.

In low cost microprocessors, multiplication and division are more computationally intensive than register shifts. Coefficients that are implemented with register shifts allow for low computational algorithm. As an example, the weight for LTP and MA can be 0.5. A division by 0.5 is accomplished with a register shift right.

After the serial idle trigger has been updated (step S110), the information in the serial data transfer buffer 36 is transferred to the RF data transfer buffer 38 for wireless transmission (step S112), the serial idle timer 40 is reset (step S114), e.g., SerialIdleCnt=0, and the predictor 52 returns to a wait for the next trigger (step S102).

Returning to decision block S106, if the amount of data in the serial data buffer 36, e.g., ByteCnt, has reached the predetermined RF data buffer 38 size, e.g., RFBuffSize (step S106), then the trigger is caused by the serial data transfer buffer 36 being full. The RF data buffer size is associated with the physical buffer size of the radio chip. However the RF data buffer size may be adjusted for various reasons, such as, the locations of buffer bytes for use by control and messaging bytes. Locations may be unused to provide margin in case of overflow. The information in the serial data transfer buffer 36 is transferred to the RF data transfer buffer 38 for wireless transmission (step S116) and the serial idle timer 40 is reset (step S118), e.g., SerialIdleCnt=0. The predictor then sets the $X_N$ term of the serial idle short term moving average 42, e.g., RefSerialIdleCnt, to the largest SerialIdleCnt value seen since the last update (step S120) and the predictor 52 returns to a wait for the next trigger (step S102).

Embodiments of the present invention may use this method for predicting optimal RF transmissions to allow an EAS sensor that is normally hard-wired to a control unit to be implemented as a wireless device. As embodiments of the present invention do not require expensive wireless hardware for each sensor or complex communication protocol stacks in the wireless access point or wireless device nodes, the EAS communication network may be established quickly and relatively inexpensively when compared with prior methods of wireless communication.

The present invention can be realized in hardware, software, or a combination of hardware and software. Any kind of computing system, or other apparatus adapted for carrying out the methods described herein, is suited to perform the functions described herein.

A typical combination of hardware and software could be a specialized computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A wireless access point for communicating messages in an electronic article surveillance network, the electronic article surveillance network including at least one electronic article surveillance sensor hard-wired to at least one wireless device node, the wireless access point comprising:

- a wired communication interface configured to receive a message, the message including a sub-layer address corresponding to an electronic article surveillance sensor;
- a wireless communication interface configured to:
  - broadcast the message; and
  - receive an acknowledgement of the broadcast message, the acknowledgment originating from the electronic article surveillance sensor corresponding to the sub-layer address;
- a universal asynchronous receiver/transmitter buffer configured to receive the message through the wired communication interface, the message having been received as a series of data packets;
- a radio frequency data transfer buffer configured to store data packets to be broadcast through the wireless communication interface;
- a serial data transfer buffer configured to transfer data packets between the universal asynchronous receiver/transmitter buffer and the radio frequency data transfer buffer;
- a controller electrically coupled to the wired communication interface and to the wireless communication interface, the controller configured to:
  - transfer the message between the wired communication interface and the wireless communication interface in bursts; and
- a predictor configured to:
  - measure a serial idle time between bursts;
  - calculate a moving average of the measured serial idle time between bursts;
  - adaptively predict a serial idle trigger based on the moving average of the measured serial idle time between bursts; and
  - responsive to the serial idle time between bursts reaching the serial idle trigger, transferring data packets from the serial data transfer buffer to the radio frequency data transfer buffer.

2. The wireless access point of claim 1, wherein responsive to not receiving the acknowledgement of the broadcast message within a predetermined time, the wireless communication interface is further configured to rebroadcast the message.

3. The wireless access point of claim 1, wherein the wired communication interface is configured to receive the message from a local device manager.

4. The wireless access point of claim 1, wherein the wired communication interface is further configured to receive a data packet on the universal asynchronous receiver/transmitter buffer while the controller simultaneously transfers data packets from the serial data transfer buffer to the radio frequency data transfer buffer.

5. The wireless access point of claim 4, wherein the controller is further configured to transfer data packets from the universal asynchronous receiver/transmitter buffer to the serial data transfer buffer in bursts, the bursts of data packets having a variable time lapse between bursts.

6. The wireless access point of claim 5, wherein the serial idle trigger is a weighted sum of a long term predictor value and the moving average of the measured serial idle time between bursts plus a minimum serial idle constant.

7. The wireless access point of claim 1, wherein the wireless communication interface is further configured to:

transmit a point-to-point message to a wireless device node, the point-to-point message including a wireless network layer address corresponding to the wireless device node; and receive an acknowledgement to the point-to-point message from the wireless device node corresponding to the wireless network layer address.

8. An electronic article surveillance network supporting at least one electronic article surveillance sensor having a corresponding sub-layer address, the electronic article surveillance network comprising:

an access point including:

a first wired communication interface configured to receive a message;

a first wireless communication interface in communication with the first wired communication interface;

a universal asynchronous receiver/transmitter buffer configured to receive the message through the first wired communication interface, the message having been received as a series of data packets;

a radio frequency data transfer buffer configured to store data packets to be broadcast through the first wireless communication interface; and a serial data transfer buffer configured to transfer data packets between the universal asynchronous receiver/transmitter buffer and the radio frequency data transfer buffer;

the access point configured to:

receive the message through the first wired communication interface, the message including the sub-layer address corresponding to an electronic article surveillance sensor;

transfer the message from the first wired communication interface to a first wireless communication interface in bursts;

measure a serial idle time between bursts;

calculate a moving average of the measured serial idle time between bursts; and adaptively predict a serial idle trigger based on the moving average of the measured serial idle time between bursts;

responsive to the serial idle time between bursts reaching the serial idle trigger, transfer data packets from the serial data transfer buffer to the radio frequency data transfer buffer;

broadcast the message through the first wireless communication interface; and receive an acknowledgement of the broadcast message through the first wireless communication interface; and the at least one wireless device node having a wireless network layer address, the at least one wireless device node wirelessly coupled to the access point and hard-wired to the at least electronic article surveillance sensor, the at least one wireless device node configured to:

receive the broadcast message through a second wireless communication interface;

forward the broadcast message through a second wired communication interface to the electronic article surveillance sensor corresponding to the sub-layer address included in the received broadcast message;

receive an acknowledgement of the broadcast message through the second wired communication interface from the electronic article surveillance sensor; and forward the acknowledgement of the broadcast message through the second wireless communication interface.

9. The network of claim 8, wherein responsive to not receiving the acknowledgement of the broadcast message within a predetermined time, the access point is further configured to rebroadcast the message.

10. The network of claim 8, further comprising a local device manager electrically connected to the access point through the first wired communication interface, the local device manager being configured to transmit the message to the access point.

11. The network of claim 8, wherein the access point is further configured to receive a data packet on the universal asynchronous receiver/transmitter buffer while simultaneously transferring data packets from the serial data transfer buffer to the radio frequency data transfer buffer.

12. The network of claim 11, wherein the access point is configured to transfer data packets from the universal asynchronous receiver/transmitter buffer to the serial data transfer buffer in bursts, the bursts of data packets having a variable time lapse between bursts.

13. The network of claim 12, wherein the serial idle trigger is a weighted sum of a long term predictor value and the moving average of the measured serial idle time between bursts plus a minimum serial idle constant.

14. The network of claim 8, wherein the access point is further configured to:

transmit a point-to-point message to a wireless device node through the first wireless communication interface, the point-to-point message including a wireless network layer address corresponding to the wireless device node; and receive an acknowledgement to the point-to-point message from the wireless device node corresponding to the wireless network layer address through the first wireless communication interface.

15. A method for communicating messages in an electronic article surveillance network, the electronic article surveillance network including at least one electronic article surveillance sensor hard-wired to at least one wireless device node, the method comprising:

receiving a message through a wired communication interface, the message including a sub-layer address corresponding to an electronic article surveillance sensor;

transferring the message from the wired communication interface to a wireless communication interface in bursts;

measuring a serial idle time between bursts;

calculating a moving average of the measured serial idle time between bursts;

adaptively predicting a serial idle trigger based on the moving average of the measured serial idle time between bursts;

responsive to the serial idle time between bursts reaching the serial idle trigger, transferring data packets from a serial data transfer buffer to a radio frequency data transfer buffer;

broadcasting the message through the wireless communication interface; and receiving an acknowledgement of the broadcast message through the wireless communication interface, the acknowledgment originating from the electronic article surveillance sensor corresponding to the sub-layer address.

16. The method of claim 15, wherein responsive to not receiving the acknowledgement of the broadcast message within a predetermined time, rebroadcasting the message.

17. The method of claim 15, further comprising:

receiving the message through a universal asynchronous receiver/transmitter buffer, the message having been received as a series of data packets;

using the serial data transfer buffer to transfer data packets between the universal asynchronous receiver/transmitter buffer and the radio frequency data transfer buffer;

storing data packets to be broadcast through the first wireless communication interface in the radio frequency data transfer buffer; and simultaneously receiving a data packet on the universal asynchronous receiver/transmitter buffer while the controller transfers data packets from the serial data transfer buffer to the radio frequency data transfer buffer.

18. The method of claim 17, wherein the data packets are transferred from the universal asynchronous receiver/transmitter buffer to the serial data transfer buffer in bursts, the bursts of data packets having a variable time lapse between bursts.

19. The method of claim 18, wherein the serial idle trigger is a weighted sum of a long term predictor value and the moving average of the measured serial idle time between bursts plus a minimum serial idle constant.

20. The method of claim 15, further comprising:

transmitting a point-to-point message to a wireless device node, the point-to-point message including a wireless network layer address corresponding to the wireless device node; and receiving an acknowledgement to the point-to-point message from the wireless device node corresponding to the wireless network layer address.

* * * * *